United States Patent
Gaikwad et al.

(10) Patent No.: US 12,297,116 B2
(45) Date of Patent: May 13, 2025

(54) SYSTEM FOR MANUFACTURING FUMED SILICA PARTICLES

(71) Applicant: Sterlite Technologies Limited, Aurangabad (IN)

(72) Inventors: Sandeep Gaikwad, Aurangabad (IN); Ranjith Balakrishnan, Aurangabad (IN); Badri Gomatam, Aurangabad (IN)

(*) Notice: Subject to any disclaimer, the term of this patent is extended or adjusted under 35 U.S.C. 154(b) by 284 days.

(21) Appl. No.: 16/849,951

(22) Filed: Apr. 15, 2020

(65) Prior Publication Data
US 2021/0047190 A1    Feb. 18, 2021

(30) Foreign Application Priority Data
Aug. 13, 2019   (IN) .............. 201921032758

(51) Int. Cl.
*B01J 12/02*   (2006.01)
*B01J 4/00*   (2006.01)
*C01B 33/18*   (2006.01)
*C03B 37/012*   (2006.01)

(52) U.S. Cl.
CPC ............ *C01B 33/183* (2013.01); *B01J 4/001* (2013.01); *B01J 12/02* (2013.01); *C03B 37/012* (2013.01)

(58) Field of Classification Search
CPC ....................................................... B01J 12/02
See application file for complete search history.

(56) References Cited

U.S. PATENT DOCUMENTS

| | | | | |
|---|---|---|---|---|
| 2,635,946 A * | 4/1953 | Frey | ........................ | C01G 23/07 423/628 |
| 3,403,001 A * | 9/1968 | Mas | ........................ | C01B 13/22 423/613 |
| 3,586,489 A * | 6/1971 | Hilgers et al. | .......... | C01B 13/22 423/613 |
| 4,572,827 A * | 2/1986 | Flemmert | .............. | B01J 12/005 423/337 |
| 5,849,092 A * | 12/1998 | Xi | ........................ | C23C 16/4405 134/1.1 |
| 2012/0318457 A1* | 12/2012 | Nguyen | .............. | C23C 16/4404 239/548 |

* cited by examiner

*Primary Examiner* — Lessanework Seifu
(74) *Attorney, Agent, or Firm* — Steven R. Fairchild

(57) ABSTRACT

The present disclosure provides a system for generating fumed silica particles for manufacturing of an optical fiber preform. The system includes a generator and a plurality of inlets connected with the generator. The generator includes a plurality of burners. The plurality of inlets include a first inlet, a second inlet, a third inlet and a fourth inlet. The first inlet provides passage for flow of a precursor material to the generator. The second inlet provides passage for flow of a first gas to the generator. The third inlet provides passage for flow of a second gas to the generator. The fourth inlet provides passage for flow of a carrier gas to the generator. The plurality of burners enables a chemical reaction between the precursor material, the first gas and the second gas that facilitates the generation of the fumed silica particles.

8 Claims, 2 Drawing Sheets

SYSTEM FOR MANUFACTURING FUMED SILICA PARTICLES

TECHNICAL FIELD

The present disclosure relates to the field of manufacturing of fumed silica, in particular, the present disclosure relates to a system for manufacturing of fumed silica particles used for optical fibre preform. The present application is based on, and claims priority from Indian application 201921032758 filed on 13 Aug. 2019, the disclosure of which is hereby incorporated by reference herein.

BACKGROUND

An optical fibre is a flexible, transparent fibre made by drawing glass (silica) or plastic to a diameter slightly thicker than that of a human hair. Initially, the optical fibre is made by constructing a large-diameter "preform" with a carefully controlled refractive index profile. Further, the preform is pulled to form the long, thin optical fibre. The preform is commonly made by chemical vapor deposition methods such as inside vapor deposition, outside vapor deposition, vapor axial deposition, and the like. Initially, the preform is manufactured by depositing fumed silica particles on a glass body or a cylindrical body. Conventionally, the fumed silica particles are synthesized and deposited to form the glass body or cylindrical body. The conventional methods and processes for manufacturing the preform are time consuming. Also, perform manufacturing process further in the preform manufacturing process, the deposition step, wherein the deposition of silica particles on to a cylindrical body happens, the silica particles generated during reactions are not efficiently deposited that incurs the deposition losses. The size of the silica particles plays an important role since they are the base material that forms the optical fibre preform. The uniformity of the silica particles yields better preform manufacturing hence the controlling of the silica particles size is very vital.

In the light of the above stated discussion, there is a need of an advance method for manufacturing of fumed silica.

SUMMARY

In an aspect, the present disclosure provides a system for generating fumed silica particles used for manufacturing an optical fibre preform. The system includes a generator. In addition, the system includes a plurality of inlets connected with the generator. The generator includes a plurality of burners and an outlet. The plurality of burners is positioned on a first surface of the generator. The plurality of inlets are connected to the plurality of burners. Further, the plurality of inlets include a first inlet. Furthermore, the plurality of inlets include a second inlet. Moreover, the plurality of inlets include a third inlet. Also, the plurality of inlets include a fourth inlet. The first inlet provides passage for flow of a precursor material to the generator along with make up oxygen or standalone precursor material. The second inlet provides passage for flow of a first gas to the generator. The third inlet provides passage for flow of a second gas to the generator. The fourth inlet provides passage for flow of a carrier gas to the generator. The plurality of burners are utilized for raising temperature inside the generator for enabling a chemical reaction between the precursor material, the first gas and the second gas. The plurality of burners are placed in a circular manner. The chemical reaction between the precursor material, the first gas and the second gas facilitates generation of the fumed silica particles. Further, the system generates the fumed silica particles as per required size during generation or at near exit of the generator with or without use of heating or cooling.

In an aspect, the present disclosure provides a system for generating fumed silica particles used for manufacturing an optical fibre preform. The system includes a generator. In addition, the system includes a plurality of inlets connected with the generator. The generator includes a plurality of burners and an outlet. The plurality of burners is positioned on a first surface of the generator. The plurality of inlets are connected to the plurality of burners. Further, the plurality of inlets include a first inlet. Furthermore, the plurality of inlets include a second inlet. Moreover, the plurality of inlets include a third inlet. Also, the plurality of inlets include a fourth inlet. The first inlet provides passage for flow of a precursor material to the generator along with make up oxygen. The second inlet provides passage for flow of a first gas to the generator. The third inlet provides passage for flow of a second gas to the generator. The fourth inlet provides passage for flow of a carrier gas to the generator. The plurality of inlets may or may not be in sequential manner and can be arranged in any suitable way. The plurality of burners are utilized for raising temperature inside the generator for enabling a chemical reaction between the precursor material, the first gas and the second gas. The plurality of burners are placed in a circular manner. The plurality of burners may be placed in different suitable configurations. The chemical reaction between the precursor material, the first gas and the second gas facilitates generation of the fumed silica particles. Further, the system generates the fumed silica particles as per required size through controlling the precursor and gases flows, heating and/or cooling of the generated particles.

In an embodiment of the present disclosure, the generator has a coating of hastelloy material on inner walls of the generator. The coating of hastelloy material is used to avoid contamination of the fumed silica particles from materials of inner walls of the generator.

In an embodiment of the present disclosure, the precursor material is received through the vaporizer cabinet. The precursor material is at least one of silicon tetrachloride ($SiCl_4$) or octamethylcyclotetrasiloxane (OMCTS). The vaporizer cabinet is connected to the first inlet. Vaporizer cabinet design may be different for different precursor material.

In an embodiment of the present disclosure, the first gas and the second gas is received through a gas cabinet. The first gas is oxygen and the second gas is hydrogen when the precursor material is silicon tetrachloride ($SiCl_4$). The second gas is methane ($CH_4$) when the precursor material is octamethylcyclotetrasiloxan (OMCTS). The gas cabinet is connected to the second inlet and the third inlet.

In an embodiment of the present disclosure, the system includes a pneumatic control module. The pneumatic control module is utilized for operating one or more valves of the gas cabinet. The one or more valves of the gas cabinet are operated to control flow rate of the first gas and the second gas present in the gas cabinet.

In an embodiment of the present disclosure, the system includes an electrical and mass flow control panel. The electrical and mass flow control panel is connected to the vaporizer cabinet. The electrical and mass flow control panel is utilized to provide controlled supply of the precursor material along with combustion gases from the vaporizer cabinet to the generator.

In an embodiment of the present disclosure, the chemical reaction between the precursor material, the first gas and the second gas produces the fumed silica particles.

In an embodiment of the present disclosure, the generator receives the carrier gas with facilitation of the fourth inlet. The carrier gas is at least one of nitrogen ($N_2$) or air or in combination of nitrogen ($N_2$) and air.

The carrier gas carries the fumed silica particles towards the outlet of the generator through a suction. The fumed silica particles are collected in the outlet. The outlet is associated with the generator.

A primary object of the present disclosure is to provide a system for generation of fumed silica particles to manufacture an optical fibre preform.

Another object of the present disclosure is to provide the system for generation of the fumed silica particles of desired shape without any external heating and/or cooling.

Another object of the present disclosure is to provide the system for generation of the fumed silica particles of desired shape with external heating and/or cooling at outlet duct.

BRIEF DESCRIPTION OF FIGURES

Figure 1:
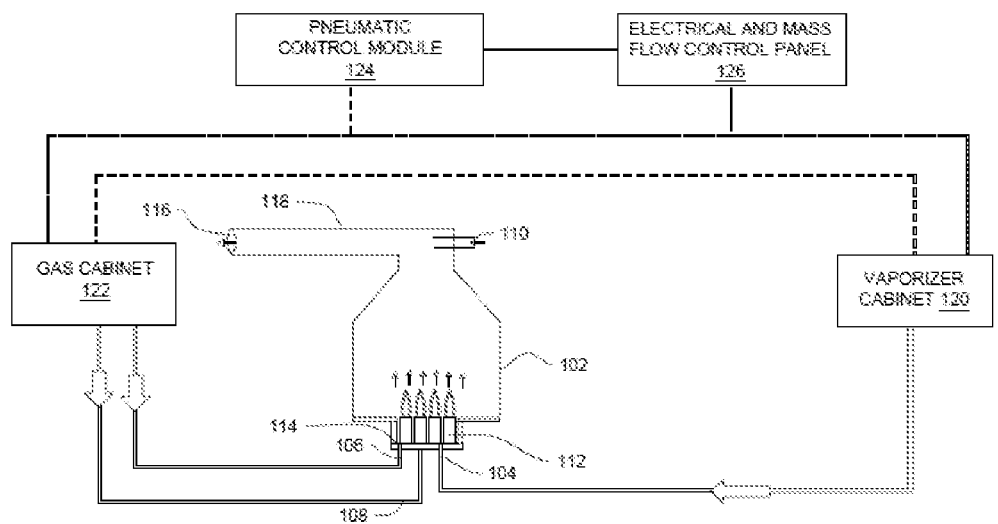
Figure 2:
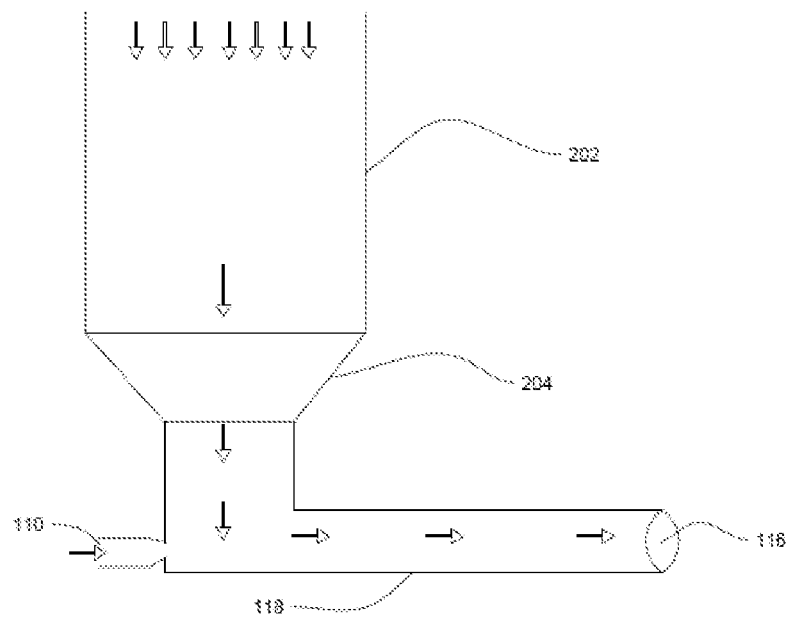

Having thus described the disclosure in general terms, reference will now be made to the accompanying figures, wherein:

FIG. 1 illustrates a system for generating fumed silica particles, in accordance with various embodiments of the present disclosure; and FIG. 2 illustrates a cross sectional view of a generator, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item. FIG. 1 illustrates a system 100 for generating fumed silica particles, in accordance with various embodiments of the present disclosure. FIG. 1 shows an arrangement of various components of the system 100. The system 100 enables a continuous process to generate the fumed silica particles. The various components of the system 100 collectively enable generation of the fumed silica particles. In general, fumed silica is an extremely small particle with enormous surface area, high purity, and a tendency to form agglomerated chains in chemical manufacturing process. In an embodiment of the present disclosure, the system 100 facilitates in generation of silicon dioxide ($SiO_2$) particles necessary to manufacture an optical fibre clad preform and optical fiber core preform. In general, optical fibre preform is a large cylindrical body of glass or soot having a core structure and a cladding structure. In addition, optical fibre preform is a material used for fabrication of optical fibres.

The system 100 includes a generator 102, a plurality of inlets, a vaporizer cabinet 120, a gas cabinet 122, a pneumatic control module 124 and an electrical and mass flow control panel 126. In addition, the generator includes an outlet 116 and an outlet pipe 118. The plurality of inlets includes a first inlet 104, a second inlet 106, a third inlet 108 and a fourth inlet 110. Each of the plurality of inlets is connected with the generator 102.

The system 100 includes the generator 102. The generator 102 has a double walled structure. Walls may be directly connected to each other or may have some gaps for cooling of walls. Cooling of walls may be done with gas or air or by any other suitable cooling means. In an embodiment of the present disclosure, the generator 102 has a coating of hastelloy material on inner walls of the generator 102. In another embodiment of the present disclosure, the generator 102 may have a coating of any suitable material on inner walls of the generator 102. In general, hastelloy materials are used to provide corrosion resistance, stress corrosion cracking resistance, and ease of welding and fabrication. In addition, hastelloy materials are resistant to temperature in a range of about 500 degree Celsius to 900 degree Celsius. In an embodiment of the present disclosure, the coating of hastelloy material on inner walls of the generator 102 is used to avoid contamination of the fumed silica particles from materials of inner walls of the generator 102. In an embodiment of the present disclosure, the generator 102 is cylindrical in shape at bottom and conical in shape at top. In another embodiment of the present disclosure, the generator 102 is of any suitable shape. In an embodiment of the present disclosure, orientation of the generator 102 is from bottom to top. In another embodiment of the present disclosure, orientation of the generator 102 is from top to bottom.

The generator 102 receives the precursor material from the vaporizer cabinet 120. In addition, the generator 102 receives the precursor material from the vaporizer cabinet 120 through the first inlet 104. The vaporizer cabinet 120 is connected with the first inlet 104. The first inlet 104 provides a passage for flow of the precursor material from the vaporizer cabinet 120 to the generator 102. In general, precursor material is a compound that participates in a chemical reaction to produce another compound. In addition, precursor is raw material used to manufacture the fumed silica particles. In an embodiment of the present disclosure, the precursor material is silicon tetrachloride ($SiCl_4$). In another embodiment of the present disclosure, the precursor material is octamethylcyclotetrasiloxane (OMCTS). In general, octamethylcyclotetrasiloxane is an organosilicon compound with chemical formula $[(CH_3)_2SiO]_4$. In addition, octamethylcyclotetrasiloxane is a colorless viscous liquid. In yet another embodiment of the present disclosure, the precursor material may be any material of the like. In an embodiment of the present disclosure, flow of the precursor material is 1413 gram per minute. In another embodiment of the present disclosure, flow of the precursor material may vary. In an embodiment of the present disclosure, make up oxygen is used with the precursor material for oxidation reaction. The generator receives the precursor material along with or without the make up oxygen.

The generator 102 receives a first gas from the gas cabinet 122. Further, the generator 102 receives the first gas from the gas cabinet 122 through the second inlet 106. In an embodiment of the present disclosure, the first gas is oxygen ($O_2$). The second inlet 106 provides a passage for flow of the first gas from the gas cabinet 122 to the generator 102. The generator 102 receives a second gas from the gas cabinet 122. In addition, the generator 102 receives the second gas from the gas cabinet 122 through the third inlet 108. The third inlet 108 provides a passage for flow of the second gas from the gas cabinet 122 to the generator 102. In an embodiment of the present disclosure, the second gas is hydrogen ($H_2$) when the precursor material is silicon tetrachloride ($SiCl_4$). In another embodiment of the present disclosure, the second gas is methane ($CH_4$) when the precursor material is octamethylcyclotetrasiloxan (OMCTS). In an embodiment of the present disclosure, the gas cabinet 122 includes one or more valves. The generator 102 receives the first gas and the second gas from the one or more valves of the gas cabinet 122.

Further, the generator 102 includes a plurality of burners 112. The plurality of burners 112 raises temperature and facilitate the chemical reactions inside the generator 102. The plurality of burners 112 is positioned on a first surface 114 of the generator 102. In an embodiment of the present disclosure, the first surface 114 of the generator 102 is defined at a bottom end inner portion of the generator 102 near the first inlet 104, the second inlet 106 and the third inlet 108. The plurality of burners 112 are mounted perpendicular to the first surface 114 of the generator 102. The rising temperature inside the generator 102 enables a chemical reaction between the precursor material, the first gas and the second gas. Further, the chemical reaction between the precursor material, the first gas and the second gas facilitates generation of the fumed silica particles. In an embodiment of the present disclosure, the chemical reaction between the precursor material, the first gas and the second gas produces the fumed silica particles. The plurality of burners 112 is placed in a circular manner. In an embodiment of the present disclosure, the plurality of burners 112 is placed in any other suitable manner of the like.

The fumed silica particles include octamethylcyclotetrasiloxane, silicon dioxide ($SiO_2$), hydrochloric acid (HCl) and water ($H_2O$). The chemical reaction between the precursor material, the first gas and the second gas is as follows: $SiCl_4 + O_2 + 2H_2 \rightarrow SiO_2 + 4HCl$. In addition, H2O is the byproduct of the chemical reaction, i.e. results of $O_2$ and $H_2$ combustion. The mass flow of gases may be referred as flow only. In an embodiment of the present disclosure, flow of $SiCl_4$ in the chemical reaction is about 1413 grams per minute. In another embodiment of the present disclosure, the flow of $SiCl_4$ in the chemical reaction may vary. Further, flow of $H_2$ in the chemical reaction is about 188 grams per minute. Furthermore, flow of $O_2$ in the chemical reaction is about 1225 grams per minute. In an embodiment of the present disclosure, flow of $O_2$ (oxygen) in the chemical reaction may vary. In an embodiment of the present disclosure, $O_2$ includes main $O_2$, make up $O_2$ and shield $O_2$. The main $O_2$ is used to burn with $H_2$ to produce large amount of heat for conversion of $SiCl_4$ to $SiO_2$. In an embodiment of the present disclosure, flow of main $O_2$ is about 895 grams per minute. In general, shield $O_2$ is used to provide heat from outside reaction zone. In an embodiment of the present disclosure, flow of the shield $O_2$ is about 113 grams per minute. The make up oxygen is used with the precursor material for oxidation reaction. In an embodiment of the present disclosure, flow of make up oxygen is about 212 grams per minute.

Moreover, flow of $SiO_2$ in the chemical reaction is about 500 grams per minute. In an embodiment of the present disclosure, flow of $SiO_2$ in the chemical reaction may vary. Also, flow of HCl in the chemical reaction is about 1215 grams per minute. In an embodiment of the present disclosure, flow of HCl in the chemical reaction may vary. Also, flow of $H_2O$ in the chemical reaction is about 1678 grams per minute. In an embodiment of the present disclosure, flow of $H_2O$ in the chemical reaction may vary.

In an example, the plurality of burners 112 generates heat of about 20723 kilojoules per minute. In addition, maximum temperature of the generator 102 due to heat produced by the plurality of burners 112 is about 1500 to 2000 degree Celsius. In addition, the temperature of the generator 102 due to heat produced by the plurality of burners 112 and due to non-stoichiometric flow may be vary.

In an example, the chemical reaction between the precursor material, the first gas and the second gas produces the fumed silica particles at a rate of about 0.057 kilogram per second. In another example, the rate of production of the fumed silica particles may vary. In an embodiment of the present disclosure, the fumed silica particles are generated with facilitation of flame hydrolysis. In yet another embodiment of the present disclosure, the fumed silica particles are generated with facilitation of any suitable process of the like. The plurality of burners 112 facilitates generation of the fumed silica particles of desired size. In addition, the plurality of burners 112 is designed to enable the fumed silica particles of desired shape. In an embodiment of the present disclosure, the plurality of burners 112 is designed to generate the fumed silica particles of any suitable form of the like.

The plurality of burners 112 facilitates nitrogen ($N_2$) shielding. The nitrogen shielding may also be provided through the fourth inlet 110. In an example, the fourth inlet 110 position may be at any other suitable location. In an another example, the fourth inlet 110 may have plurality of openings and positioned around the periphery of plurality of burners 112. The nitrogen shielding reduces temperature of the generator 102 from exceeding the maximum material limit of the generator 102. In addition, the nitrogen shielding reduces turbulence. Further, the nitrogen shielding give momentum to the plurality of products to move up towards the outlet 116 of the generator 102. In addition, the nitrogen shielding eliminates need of external cooling system and high temperature material requirements in the generator 102. In an embodiment of the present disclosure, flame characteristics of the plurality of burners 112 is controlled by varying flow rates of nitrogen shielding. The flame characteristics include but may not be limited to temperature and length of the plurality of burners 112. Further, size of the fumed silica particles is controlled without changing concentration of the precursor material. In an embodiment of the present disclosure, size of the fumed silica particles is controlled by changing temperature of the flame of the plurality of burners 112 shielded with nitrogen. In an embodiment of the present disclosure, size of the fumed silica particles is controlled by changing temperature of the outlet 118.

In an embodiment of the present disclosure, the generator 102 includes a door. The door facilitates manual ignition of the plurality of burners 112. In an embodiment of the present disclosure, number of the plurality of burners 112 in the generator 102 is 12. In another embodiment of the present disclosure, number of the plurality of burners 112 may vary. In an example, number of the plurality of burners 112 may be reduced to 5, if the geometric and flow similarity of each burner of the plurality of burners 112 is scaled up.

In an embodiment of the present disclosure, the plurality of burners 112 is replaced with a plurality of induction heaters. The plurality of induction heaters includes one or more hot tubes and one or more induction coils. In an embodiment of the present disclosure, the one or more induction coils surround each of the one or more hot tubes. The one or more induction coils are supplied with high frequency alternate current. The high frequency alternate current produces alternating magnetic field. Further, the alternating magnetic field produces eddy current in the generator 102. Furthermore, the generator 102 is heated to high temperature because of the high frequency alternate current and eddy current. In general, eddy currents are loops of electrical current induced within conductors by a changing magnetic field. Moreover, the precursor material along with oxygen entering the generator 102 undergoes oxidation process. In an embodiment of the present disclosure, the oxidation process eliminates OH (hydroxide) ions from the fumed silica particles and generates OH free silica particles. In an example, the oxidation process of the precursor material requires high temperature above 1100 degree Celsius.

In an embodiment of the present disclosure, the generator 102 is connected with one or more fire safety mechanisms. In another embodiment of the present disclosure, the generator 102 includes the one or more fire safety mechanisms. The one or more fire safety mechanisms include but may not be limited to no flame sensors. In general, fire safety mechanisms are used to help prevent ignition of uncontrolled fire, helping to ensure safer handling.

Further, the generator 102 receives a carrier gas with facilitation of the fourth inlet 110. In an example, the generator 102 receives the carrier gas through the fourth inlet 110 at a flow rate of about 0.372 kilogram per second. The fourth inlet 110 provides passage for flow of the carrier gas to the generator 102. In an example, the fourth inlet 110 position may be at any other suitable location. In an another example, the fourth inlet 110 may have plurality of openings and positioned around the periphery of plurality of burners 112. In an embodiment of the present disclosure, the carrier gas is nitrogen ($N_2$). In another embodiment of the present disclosure, the carrier gas is air. In yet another embodiment of the present disclosure, the carrier gas may be any suitable gas of the like. In an embodiment of the present disclosure, the carrier gas or air will be supplied to reduce the temperature of generator 102. In addition, the carrier gas enables flow of the fumed silica particles towards the outlet 116 of the generator 102. In an embodiment of the present disclosure, the fumed silica particles include silicon dioxide ($SiO_2$), hydrochloric acid (HCl), water ($H_2O$) and nitrogen ($N_2$).

The outlet 116 is utilized to collect the fumed silica particles. In an embodiment of the present disclosure, the outlet 116 is associated with the generator 102. The fumed silica particles flow through the outlet pipe 118 towards the outlet 116 where the fumed silica particles are collected. In another embodiment of the present disclosure, temperature of the outlet pipe 118 may vary. In an embodiment of the present disclosure, size of the fumed silica particles depends on length of the outlet pipe 118. In addition, size of the fumed silica particles varies by varying length of the outlet pipe 118. In an embodiment of the present disclosure, temperature of the fumed silica particles depends on the temperature of the outlet pipe 118. Further, temperature of the fumed silica particles varies by varying temperature of the outlet pipe 118. The temperature of the outlet pipe 118 is controlled by heat exchangers (not shown in the figure) provided outside the outlet pipe 118.

Further, the system 100 includes the pneumatic control module 124. The pneumatic control module 124 is used to operate the one or more valves of the gas cabinet 122. In addition, the one or more valves are operated to control flow rate of the first gas and the second gas present in the gas cabinet 122. In addition the pneumatic control module 124 and the electrical and mass flow control panel 126 may use to control the fourth inlet 110.

Furthermore, the system 100 includes the electrical and mass flow control panel 126. In an embodiment of the present disclosure, the electrical and mass flow control panel 126 is connected to the vaporizer cabinet 120. The electrical and mass flow control panel 126 is used to provide controlled supply of the precursor material along with combustion gases from the vaporizer cabinet 120 to the generator 102. The combustion gases include gases such as hydrogen, oxygen, and the like.

FIG. 2 illustrates a structural view 200 of the generator 102 of FIG. 1, in accordance with an embodiment of the present disclosure.

The generator 102 includes a cylindrical body 202, a conical body 204, the outlet 116 and the outlet pipe 118. In addition, the cylindrical body 202 of the generator 102 includes the plurality of burners 112. The conical body 204 of the generator 102 and the outlet pipe 118 of the generator 102 are connected with each other. The cylindrical body 202 of the generator 102 is characterised by length and width. In an example, length of the cylindrical body 202 of the generator 102 is about 0.9 meter. In another embodiment of the present disclosure, length of the cylindrical body 202 of the generator 102 may vary. In an example, diameter of the cylindrical body 202 of the generator 102 is about 0.6 meter. In another embodiment of the present disclosure, diameter of the cylindrical body 202 of the generator 102 may vary. In an embodiment of the present disclosure, orientation of the generator 102 is from top to bottom. In another embodiment of the present disclosure, orientation of the generator 102 is from bottom to top.

The cylindrical body 202 of the generator 102 receives the precursor material from the vaporizer cabinet 120 through the first inlet 104. In addition, the cylindrical body 202 of the generator 102 receives the first gas and the second gas from the gas cabinet 122 through the second inlet 106 and the third inlet 108 respectively (as shown in FIG. 1). Further, the plurality of burners 112 raises temperature of the generator 102. The plurality of burners 112 are positioned on the first surface 114 (as shown in FIG. 1) of the generator 102. Furthermore, the rising temperature of the generator 102 enables the chemical reaction between the precursor material, the first gas and the second gas. In an embodiment of the present disclosure, the chemical reaction between the precursor material, the first gas and the second gas produces the fumed silica particles. The fumed silica particles are produced in the cylindrical body 202 of the generator 102. Moreover, the fumed silica particles include silicon dioxide ($SiO_2$), hydrochloric acid (HCl) and water ($H_2O$). Also, the fumed silica particles moves to the conical body of the generator 102 towards the outlet pipe 118 of the generator 102.

In an embodiment of the present disclosure, the generator 102 receives the carrier gas in the outlet pipe 118 of the generator 102 through the fourth inlet 110. In an example, the fourth inlet 110 position may be at any other suitable location at outlet pipe 118. In an example, the carrier gas is received at a flow rate of about 0.372 kilogram per second. In an example, flow rate of the carrier gas received may vary. In an embodiment of the present disclosure, the carrier gas is at least one of nitrogen ($N_2$) or air. In another embodiment of the present disclosure, the carrier gas may be any suitable gas of the like. In general, nitrogen gas is used for cooling purposes as well as pneumatic conveyance. In an embodiment of the present disclosure, the carrier gas is injected at high velocity. In addition, the carrier. In an embodiment of the present disclosure, the carrier gas or air will be supplied to reduce the temperature of generator 102. The fumed silica particles in the gas stream include silicon dioxide ($SiO_2$), hydrochloric acid (HCl), water ($H_2O$) and nitrogen ($N_2$). Further, the carrier gas enables flow of the fumed silica particles towards the outlet 116 of the generator 102.

In an example, the fumed silica particles are generated at a velocity of about 15 meter per second. In another example, the velocity of the fumed silica particles may vary. In an embodiment of the present disclosure, the fumed silica particles are generated at a rate of about 500 grams per minute. In another example, the rate of generation of the fumed silica particles may vary. In an example, temperature of the fumed silica particles is about 475 degree celsius at exit of generator. In another embodiment of the present disclosure, temperature of the fumed silica particles may vary.

In an embodiment of the present disclosure, the inline heater surrounds the first inlet 104. The inline heater converts liquid form of the precursor material into vapor in the first inlet 104. In an embodiment of the present disclosure, temperature of the precursor material varies by increasing or decreasing electric power of the inline heater in the generator 102. In an embodiment of the present disclosure, inner wall of the first inlet 104 is coated with corrosion resistant material. In an embodiment of the present disclosure, pressure increases in the first inlet 102 surrounded by the inline heater due to phase change of the precursor material. The increase in pressure is depends on increase in thickness and diameter of the first inlet 104 of the generator 102. The inline heater saves considerable amount of space and reduces maintenance cost of the vaporizer 120. In addition, the inline heater simplifies complicated design of the vaporizer cabinet 120. In an embodiment of the present disclosure, the system 100 generates the fumed silica particles as per required size.

In an embodiment of the present disclosure, the fumed silica particles are used to manufacture fluorine doped tubes, germanium doped tubes and the like. In addition, the fumed silica particles are used to manufacture pure silicon dioxide clad cylinder for online or offline Rod in Cylinder process (RIC process). In general, Rod in Cylinder process is a large volume production process for manufacturing of optical fibre. The fumed silica particles are sintered directly after one or more processes to manufacture silicon dioxide clad cylinder. The one or more processes includes cold press, hot press and the like. In addition, the fumed silica particles are sintered directly after the one more processes with fluorine diffusion to manufacture fluorine doped tubes.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. A system for generating fumed silica particles used for manufacturing of an optical fibre preform, the system comprising:
    a generator, wherein the generator comprising a plurality of burners and an outlet, wherein the plurality of burners are positioned on a first surface of the generator;
    a plurality of inlets connected with the generator, wherein the plurality of inlets comprising:
        a first inlet, wherein the first inlet provides a passage for flow of a precursor material to the generator along with make up oxygen;
        a second inlet, wherein the second inlet provides a passage for flow of a first gas to the generator;
        a third inlet, wherein the third inlet provides a passage for flow of a second gas to the generator;
        a fourth inlet, wherein the fourth inlet provides a passage for flow of a carrier gas to the generator, wherein the fourth inlet has a plurality of openings and is positioned around a periphery of plurality of burners,
    wherein the plurality of burners is utilized for raising temperature inside the generator for enabling a chemical reaction between the precursor material, the first gas and the second gas, wherein the chemical reaction between the precursor material, the first gas and the second gas facilitates generation of the fumed silica particles,
    wherein the system generates the fumed silica particles as per required size, and
    an electrical and mass flow control panel, wherein the electrical and mass flow control panel is utilized to control the fourth inlet, wherein the electrical and mass flow control panel is connected to a vaporizer cabinet, wherein the electrical and mass flow control panel is utilized for providing controlled supply of the precursor material along with combustion gases from the vaporizer cabinet to the generator.

2. The system as claimed in claim 1, wherein the generator has a coating on inner walls of the generator, wherein the coating is used to avoid contamination of the fumed silica particles.

3. The system as claimed in claim 1, wherein the precursor material is received through a vaporizer cabinet, wherein the precursor material is at least one of silicon tetrachloride (SiCl4) or octamethylcyclotetrasiloxan (OMCTS), wherein the vaporizer cabinet is connected to the first inlet of the generator.

4. The system as claimed in claim 1, wherein the first gas and the second gas is received through a gas cabinet, wherein the first gas is oxygen, wherein the second gas is hydrogen when the precursor material is silicon tetrachloride (SiCl4), wherein the second gas is methane (CH4) when the precursor material is octamethylcyclotetrasiloxan (OMCTS), wherein the gas cabinet is connected to the second inlet and third inlet.

5. The system as claimed in claim 1, further comprising a pneumatic control module, wherein the pneumatic control module is utilized for operating one or more valves of a gas cabinet, wherein the one or more valves of the gas cabinet are operated for controlling flow rate of the first gas and the second gas present in the gas cabinet and carrier gas through fourth inlet.

6. The system as claimed in claim 1, wherein the chemical reaction between the precursor material, the first gas and the second gas produces the fumed silica particles.

7. The system as claimed in claim 1, wherein the generator receives the carrier gas with facilitation of the fourth inlet, wherein the carrier gas is at least one of nitrogen (N2) or air.

8. The system as claimed in claim 1, wherein the carrier gas carries the fumed silica particles towards one or more outlets of the generator, wherein the fumed silica particles are collected in the one or more outlets.

* * * * *